(12) United States Patent
Saint-Jalmes et al.

(10) Patent No.: US 7,712,704 B2
(45) Date of Patent: May 11, 2010

(54) ARRANGEMENT OF SEATS AND BAGGAGE COMPARTMENTS IN AN AIRCRAFT CABIN

(75) Inventors: Bruno Saint-Jalmes, Toulouse (FR); Andre Rezag, Toulouse (FR); Jason Zaneboni, Toulouse (FR)

(73) Assignee: Airbus, Blagnac (FR)

( * ) Notice: Subject to any disclaimer, the term of this patent is extended or adjusted under 35 U.S.C. 154(b) by 402 days.

(21) Appl. No.: 11/444,384

(22) Filed: Jun. 1, 2006

(65) Prior Publication Data

US 2006/0273222 A1    Dec. 7, 2006

Related U.S. Application Data

(60) Provisional application No. 60/697,348, filed on Jul. 8, 2005.

(30) Foreign Application Priority Data

Jun. 7, 2005    (FR)    ................................... 05 05758

(51) Int. Cl.
*B64D 11/06* (2006.01)
(52) U.S. Cl. .................. 244/118.6; 244/118.5; 244/119
(58) Field of Classification Search ............. 244/118.5, 244/118.6, 122 R, 122, 118.1, 119, 120; 312/247, 245, 246, 248; 114/189, 192
See application file for complete search history.

(56) References Cited

U.S. PATENT DOCUMENTS

| | | | | |
|---|---|---|---|---|
| 2,124,003 | A * | 7/1938 | Helwig et al. ............. | 244/118.6 |
| 4,686,908 | A * | 8/1987 | Legrand ..................... | 105/315 |
| 4,951,560 | A | 8/1990 | Setan | |
| 5,108,048 | A * | 4/1992 | Chang ..................... | 244/118.1 |
| 5,383,628 | A * | 1/1995 | Harriehausen et al. ... | 244/118.1 |
| 5,716,026 | A | 2/1998 | Pascasio et al. | |
| 5,934,615 | A * | 8/1999 | Treichler et al. .......... | 244/118.5 |
| RE36,642 | E * | 4/2000 | Ziadi ........................... | 362/471 |
| 6,045,204 | A * | 4/2000 | Frazier et al. ............... | 312/247 |
| 6,484,969 | B2 * | 11/2002 | Sprenger et al. .......... | 244/118.5 |
| 6,886,781 | B2 * | 5/2005 | Lau et al. .................. | 244/118.1 |
| 6,899,299 | B2 * | 5/2005 | Ritts ........................ | 244/118.5 |
| 7,025,306 | B2 * | 4/2006 | Saint Jalmes ............ | 244/118.6 |
| 7,121,510 | B2 * | 10/2006 | Ritts ........................ | 244/118.5 |
| 7,156,346 | B2 * | 1/2007 | Mercier ................... | 244/118.6 |
| 7,168,658 | B2 * | 1/2007 | Mercier ................... | 244/118.6 |
| 7,252,268 | B2 * | 8/2007 | Saint-Jalmes ............ | 244/118.6 |
| 7,320,446 | B2 * | 1/2008 | Saint-Jalmes et al. .... | 244/118.6 |
| 2001/0011692 | A1 * | 8/2001 | Sprenger et al. ......... | 244/118.5 |

(Continued)

FOREIGN PATENT DOCUMENTS

FR    2843730    2/2004

*Primary Examiner*—Benjamin P Lee
(74) *Attorney, Agent, or Firm*—Oblon, Spivak, McClelland, Maier & Neustadt, L.L.P.

(57) ABSTRACT

An aircraft cabin segment includes at least one longitudinally extending aisle, seats disposed in rows, at least two assemblies of baggage compartments, and ventilation outlets. The seats disposed in rows are transversal relative to the longitudinal aisle. The at least two assemblies of baggage compartments are aligned and positioned overhead. The baggage compartments of each of the two assemblies are aligned in a transversal direction and are positioned above the seats such that bottom surfaces of the baggage compartments form a sinusoidal wave along a longitudinal direction of the aircraft cabin segment. The ventilation outlets are disposed between the two assemblies of the baggage compartments.

20 Claims, 2 Drawing Sheets

U.S. PATENT DOCUMENTS

| | | | |
|---|---|---|---|
| 2003/0218095 A1* | 11/2003 | Saint Jalmes | 244/118.5 |
| 2004/0016847 A1* | 1/2004 | Ritts | 244/118.5 |
| 2005/0001098 A1* | 1/2005 | Saint-Jalmes | 244/118.6 |
| 2005/0072878 A1* | 4/2005 | Ritts | 244/118.5 |
| 2006/0097553 A1* | 5/2006 | Spurlock et al. | 297/248 |
| 2006/0192050 A1* | 8/2006 | Cheung et al. | 244/118.6 |
| 2006/0273222 A1* | 12/2006 | Saint-Jalmes et al. | 244/118.6 |
| 2007/0102577 A1* | 5/2007 | Saint-Jalmes et al. | 244/118.6 |
| 2007/0152100 A1* | 7/2007 | Saint-Jalmes et al. | 244/118.6 |
| 2007/0164155 A1* | 7/2007 | Muin et al. | 244/118.5 |
| 2007/0295863 A1* | 12/2007 | Thompson | 244/118.6 |
| 2008/0078869 A1* | 4/2008 | Kneller et al. | 244/118.5 |

* cited by examiner

ARRANGEMENT OF SEATS AND BAGGAGE COMPARTMENTS IN AN AIRCRAFT CABIN

BACKGROUND OF THE INVENTION

I. Field of the Invention

The present invention relates to an arrangement of seats and of baggage compartments in an aircraft cabin, such as, for example, an airplane.

The invention relates more particularly but not exclusively to the interior arrangement of airplanes operated commercially by airline companies for transportation of passengers on regularly scheduled flights or on charter flights. In such airplanes, the problem always arises of accommodating a large number of passengers while at the same time making them as comfortable as possible.

II. Description of Related Art

In an airliner or similar airplane, the seats are usually disposed in columns and rows, and are all oriented in the same direction. Depending on the width of the cabin and the number of seats disposed abreast in a given row, one to three longitudinal aisles are generally provided for access to the seats.

Baggage compartments for storing baggage are provided in the upper part of the cabin. These baggage compartments are aligned longitudinally above the seats. These baggage compartments extend substantially over the entire length of the aircraft cabin or of a cabin segment disposed between two successive emergency exits. These baggage compartments are generally accessible from the aisles. To access a baggage compartment, a passenger assumes a standing position facing that baggage compartment. He is then turned toward one of the longitudinal walls of the aircraft cabin, in a manner transversal relative to that aircraft.

Such a prior art configuration suffers from several disadvantages. As an example, a first disadvantage is that the space intended for baggage storage is relatively limited. Consequently, each passenger is allowed to carry only a volume of baggage of the currently authorized maximum size with him into the cabin. In this regard, reliance is placed on the fact that, statistically, each passenger will carry a volume of baggage smaller than the maximum authorized volume with him into the cabin.

Another disadvantage is that the baggage compartments are located above the seats and are disposed parallel to the aisle in such a way that when a passenger stands up he risks bumping his head on the baggage compartment situated above him.

Another disadvantage is that the passengers store their baggage while they are standing in the aisle that provides access to the seats. As a result, during boarding in particular, passengers loading their baggage into the baggage compartments obstruct the movement of other passengers who want to reach their seat.

The fact that the columns of baggage compartments extend longitudinally in parallel with the aisle(s) also has little esthetic appeal, because the baggage compartments accentuate the perspective effect created by the aisle(s).

Finally, the current ventilation systems in aircraft do not permit good air circulation. This is obviously detrimental to the good comfort of the passengers.

BRIEF SUMMARY OF THE INVENTION

The objective of the present invention is therefore to provide an aircraft interior arrangement in which the space for baggage is enlarged without limiting the comfort of the passenger. Preferably this arrangement will favor more fluid boarding of the passengers. Advantageously it will also be original and agreeable from the esthetic viewpoint. Finally, it will permit good air circulation in the cabin.

To this end, the invention proposes an aircraft cabin segment provided with:

at least one longitudinally extending aisle, seats disposed in rows that are transversal relative to the longitudinal aisle, at least one assembly of baggage compartments that are aligned and positioned overhead.

According to the present invention, the baggage compartments are aligned in transversal direction and are positioned above seats.

In such a configuration, the baggage compartments are disposed above seats, or in other words at places where the passengers are seated and possibly stretched out, but not standing. By virtue of this fact, the available space is relatively large, because it is not necessary to provide for the ability to move underneath the baggage compartment, as is the case in prior art cabins. In addition, in view of the orientation of baggage compartment alignments, access to these compartments is achieved more naturally by standing in front of a seat than by standing in a longitudinal aisle extending through the cabin. Passengers who are placing their baggage in and removing it from the baggage compartment therefore do not obstruct the movement of the other passengers in the longitudinal aisle(s).

In an aircraft cabin segment according to the invention, the baggage compartments are preferably placed above the seat backs in such a manner that they do not risk inconveniencing the passengers as they sit down or stand up.

In such an aircraft cabin segment, the alignment of baggage compartments is advantageously interrupted above a longitudinal aisle in such a manner that it does not obstruct the movement of passengers and personnel navigating in this aisle.

A preferred configuration of a segment according to the invention provides that each seat of this segment is composed of a bottom and a back, and that the seats of two successive rows are alternately disposed face-to-face or else back-to-back. In this way, two rows of baggage compartments can be joined to one another. Visually, this makes it possible to limit the number of overhead transverse separations. This also makes it possible to lighten the structure by using common elements for the two rows of joined compartments.

In order to permit air circulation between two successive rows of baggage compartments (that are not joined to one another), the baggage compartments are advantageously streamlined in such a way as to preclude possible sharp transversal edges due to the presence of the baggage compartments.

An alternative embodiment of the invention provides that each baggage compartment is composed of a bin fixed to the ceiling of the aircraft cabin segment and of a drawer that can be moved between a closed position, in which the drawer is housed in the bin, and an open position, in which the drawer projects out of the bin, the bin and the drawer having walls disposed in such a way that objects placed in the drawer are inaccessible from the outside of the baggage compartment when the drawer is in closed position and are accessible via an opening when the drawer is in open position. In this alternative embodiment, the drawer moves from its open position to its closed position by, for example, a substantially vertical translational movement.

For its ventilation, the cabin segment according to the invention is provided, for example, with air conduits extending longitudinally above the baggage compartments, as well as with ventilation outlets disposed between two alignments of baggage compartments, substantially equidistant therefrom.

The present invention also relates on the one hand to an aircraft cabin and on the other hand to an aircraft provided with at least one cabin segment such as described hereinabove.

BRIEF DESCRIPTION OF THE DRAWINGS

Details and advantages of the present invention will be better understood from the description hereinafter with reference to the attached schematic drawings, wherein.

DETAILED DESCRIPTION OF THE INVENTION

Figure 1:
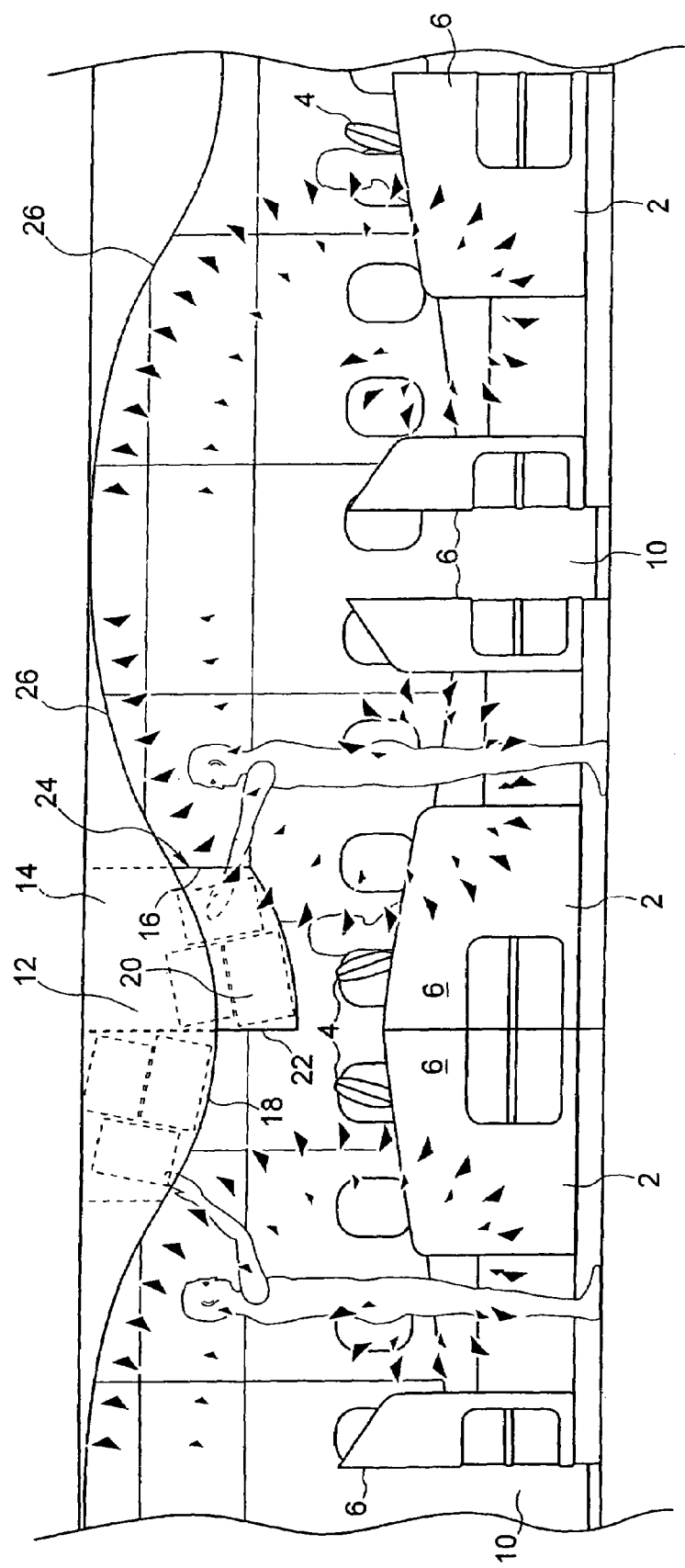
FIG. 1 is a view in longitudinal partial section of an aircraft cabin segment according to the invention.
Figure 2:
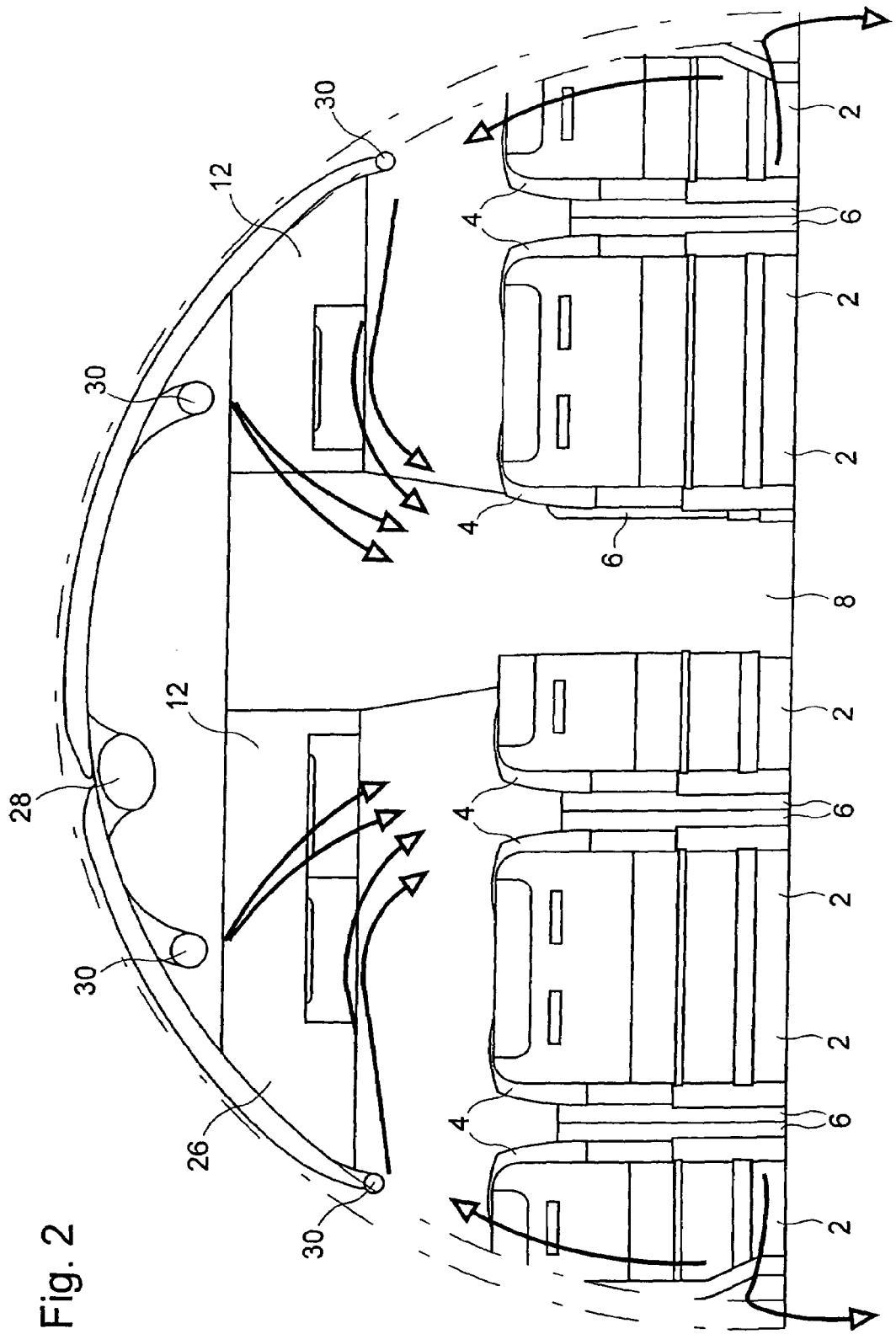
FIG. 2 is a view in transversal partial section of an aircraft cabin segment according to the invention.

FIGS. 1 and 2 schematically represent the interior of an aircraft cabin segment intended to accommodate passengers. The aircraft considered here is an airplane intended for transportation of passengers, such as an airplane of the Airbus A 340 type.

In the illustrated cabin segment, modules 2, each intended to accommodate one passenger, are disposed in transversal rows and longitudinal columns. FIG. 1 shows the modules of a longitudinal column, while FIG. 2 shows the modules of a transversal row. Each module 2 is composed in particular of a seat having a bottom (not illustrated) and a back 4 (only part of which is visible in the drawings) as well as a wall 6 surrounding each seat and defining a space reserved for each passenger. The seat is a reclinable seat, for example, and various accessories can be provided in the module (television screen or similar device, various storage units, leg rests, etc.).

In the illustrated configuration, a single longitudinal aisle 8 permits access to modules 2. Access passages 10 connect modules 2 of a given transversal row to single aisle 8. In the embodiment illustrated in the drawings, seven modules 2 are disposed abreast in the cabin, four on a first side of aisle 8 and three on the other. Each transversal row is therefore composed of seven modules 2 and can accommodate that many passengers.

It is also noted in the figures that the orientation of the seats of two successive rows is inverted. Thus two adjacent seats of a given column are disposed either back-to-back or face-to-face. This alternating disposition of the orientation of the seats of a row is advantageous within the scope of the invention, as will become evident in the course of the present description.

This configuration is similar to that illustrated in FIG. 6 of French Patent 2843730. Nevertheless, the present invention is applicable to other cabin configurations, with a single longitudinal aisle—whether or not they are illustrated in French Patent 2843730— or else with a plurality of longitudinal aisles. Similarly, the present invention is applicable to cabin segments in which each of the seats is disposed inside a module or else to more common configurations in which the seats are disposed side-by-side without separation.

Baggage compartments 12 are provided to accommodate the baggage of passengers traveling in the illustrated cabin segment. These baggage compartments 12 are disposed on the ceiling of the cabin. They are disposed in transversal rows. These rows of baggage compartments 12 are disposed above the passenger seats, and more precisely above backs 4 of these seats. There are no baggage compartments in longitudinal aisle 8. In this preferred embodiment, baggage compartments 12 are therefore located exclusively above seats.

In a preferred embodiment illustrated in the drawings, each baggage compartment 12 is formed from a bin 14 and a drawer 16. Of course, traditional baggage compartments, or in other words of the type known from the prior art, also may be used here. Bin 14 is a structure fixed to the ceiling of the cabin and intended to form a housing for corresponding drawer 16. Bin 14 and drawer 16 are provided with means that permit drawer 16 to be moved vertically between a lowered open position and a raised closed position. Such simple kinematics are unusual for a baggage compartment. They permit the use of simple and highly flexible mechanical elements.

Drawers 16 are each provided with a bottom wall 18, from which there extend vertically two side walls 20 and a back wall 22 connecting the two side walls 20. Bottom wall 18 is advantageously inclined relative to the horizontal in such a manner that it guides baggage deposited in the drawer toward back wall 22. In closed position of drawer 16, or in other words when this drawer 16 is housed in its bin 14, only the outer face of bottom wall 18 is visible from the cabin. In open position of drawer 16, side walls 20 and back wall 22 project into the cabin, and baggage can be introduced into or removed from the drawer via an opening 24 opposite back wall 22.

The travel of each drawer 16 is controlled in such a way that, when the drawer 16 in question is in lowered position, it does not strike the head of a passenger sitting on a seat located under drawer 16. In closed position of drawer 16, the bottom wall thereof merges into the form of streamlined structure 26.

FIG. 1 illustrates how a baggage compartment 12 is loaded (or unloaded). A passenger standing in front of his seat is able to open a baggage compartment without the risk of striking a seated passenger. As can be seen in FIG. 2, each seat is not necessarily provided with a baggage compartment. This figure illustrates the case of three baggage compartments for seven seats. Nevertheless, the described baggage compartments 12 can be compartments of very large capacity. The illustrated example is provided with drawers 16 that can each accommodate three bags of the maximum size currently authorized in the cabin. In this example, therefore, sufficient storage capacity is available for accommodation of nine bags, even though there are only seven passengers. This represents substantial progress compared with the majority of current airplanes, which generally do not have sufficient storage space to accommodate one bag of maximum size per passenger. Drawers 16 may be heavy once they are loaded. Pneumatic (or other) cylinders may be provided to help with maneuvering them. Electric control of drawers 16 is also conceivable. In this case, an electric motor is used to achieve opening and closing of drawer 16 of baggage compartment 12.

Bins 14, and therefore also baggage compartments 12, are streamlined to favor air circulation in the cabin segment under consideration. Above the seats and access passages 10, streamlined structure 26 has shallow sinusoidal form. The low parts of streamlined structure 26 encompass baggage compartments 12 and are disposed above seat backs 4, while the high parts of streamlined structure 26 are situated above access passages 10.

In FIGS. 1 and 2, arrows illustrate the air circulation in a cabin segment with a streamlined structure 26 as described in the foregoing. In this case, ventilation outlets are disposed substantially in access passages 10, or in other words substantially equidistant from two adjacent transversal rows of baggage compartments 12. Streamlined structure 26 then guides the air flowing out of these outlets (not illustrated)

toward the passengers seated on the seats. FIG. 2 also shows the movement of air in a transversal plane. As can be seen in the drawings, the presence of streamlined structure 26 permits the creation of a vortex, which guarantees good air circulation. Such air circulation does not exist in prior art airplanes, in which comparable air circulation cannot be created, because a transversal "barrier" is lacking.

The cabin segment configuration described in the foregoing exhibits several advantages. Firstly, the baggage compartments are located only at places intended to accommodate passengers in seated or possibly stretched out position but not in standing position. Movement of passengers in the cabin is therefore favored.

The arrangement of baggage compartments in transversal rows also has esthetic advantages. An aircraft cabin has an elongated shape, and the fact that transversely disposed elements are provided overhead breaks up the perspective imposed by the longitudinal aisle(s) for a passenger entering the cabin. In addition, for passengers who are seated or standing close to their seat, it contributes to giving an impression of a small compartment, which is friendlier than a large room.

The streamlined structure of the baggage compartments also makes it possible to create air movements that do not exist in the cabins of prior art aircraft. Such air movements permit better air circulation and better air recycling. Of course, this air circulation enhances the comfort of the passengers.

This air circulation can be achieved without modifying the current air systems of the airplanes. For example, FIG. 2 shows longitudinal air conduits that are similar to those found in prior art aircraft. Thus, in the example illustrated in FIG. 2, a large-diameter main air conduit 28 running the entire length of the aircraft cabin is disposed substantially in central position. From this main air conduit 28, secondary conduits 30 branched off from main air conduit 28 make it possible to inject fresh air into the aircraft cabin. These secondary air conduits 30 can have different diameters. As a non-limitative example, FIG. 2 illustrates, on each side of main air conduit 28, a secondary conduit of relatively large diameter (such as approximately 100 mm in diameter) and, further removed from main air conduit 28, a secondary conduit 30 of smaller diameter, such as approximately 30 mm in diameter.

In the illustrated configuration, it is possible to join two transversal rows of baggage compartments, because of the fact that a transversal row of seats whose seats are oriented in the direction of motion is disposed alternately with a transversal row of seats whose seats are oriented in the direction opposite to the direction of motion. This makes it possible to lighten the structure of the baggage compartments by using elements common to two rows of compartments. In the case in which the compartments are streamlined and the streamlined structure has substantially sinusoidal shape, in the form of waves, the distance between two successive waves can be doubled compared with a configuration in which all seats are oriented in the same direction, with a single row of baggage compartments above each row of seats.

In the proposed embodiment, the capacity of the baggage compartments is large, making it possible to offer each passenger more storage space for his hand baggage than in prior art airplanes.

In one configuration according to the invention, access to the baggage compartments is normally achieved by standing in front of a seat and not by standing in the longitudinal access aisle. Thus the passengers who deposit their baggage in a baggage compartment before taking their seats do not occupy the aisle and therefore do not disrupt the movement of other passengers proceeding to their seat. The movement in the cabin while passengers are boarding and deboarding is therefore more fluid, and these boarding and deboarding operations can be achieved more quickly than with a traditional, prior art configuration.

The proposed configuration also has the advantage that it does not involve any extra cost compared with a "traditional", prior art configuration, wherein the seats are disposed in rows and columns and the baggage compartments are aligned on both sides of the longitudinal aisles permitting access to the seats in the cabin. The simple mechanism proposed for the baggage compartments even makes it possible to lower the selling price of baggage compartments compared with conventional, prior art compartments.

The present invention is not limited to the preferred embodiment described hereinabove as a non-limitative example, and to the mentioned alternatives. It also relates to all alternative embodiments that can be understood by the person skilled in the art within the scope of the claims hereinafter.

The invention claimed is:

1. An aircraft cabin segment, comprising:
   at least one longitudinally extending aisle;
   seats disposed in rows that are transverse relative to the longitudinal aisle, wherein the seats of two successive rows are alternately disposed face-to-face and back-to-back;
   at least one transverse aisle positioned between the rows of the seats that are disposed face-to-face;
   a plurality of assemblies of baggage compartments that are aligned in a longitudinal direction of the aircraft cabin segment and positioned overhead, wherein the baggage compartments of each one of the plurality of assemblies are positioned above a respective row of the seats such that only two of the plurality of assemblies are positioned above two rows of the seats that are disposed back-to-back, and the baggage compartments are not positioned above the at least one longitudinally extending aisle and the at least one transverse aisle such that a ceiling of the aircraft cabin segment forms a sinusoidal wave along the longitudinal direction of the aircraft cabin segment having a trough above the rows of the seats that are disposed back-to-back and a crest above the at least one transverse aisle positioned between the rows of the seats that are disposed face-to-face; and
   ventilation outlets disposed between the assemblies of the baggage compartments positioned above the rows of the seats that are disposed face-to-face to circulate air to the rows of the seats that are disposed face-to-face.

2. An aircraft cabin segment according to claim 1, further comprising:
   air conduits connected to the ventilation outlets and extending longitudinally above the baggage compartments, wherein the ventilation outlets are disposed substantially equidistant from the assemblies of the baggage compartments positioned above the rows of the seats and between which the ventilation outlets are situated.

3. An aircraft cabin segment according to claim 1, wherein bottom surfaces of the baggage compartments are joined such that they do not have sharp transverse edges.

4. An aircraft cabin segment according to claim 1, wherein the baggage compartments are placed above backs of the seats.

5. An aircraft cabin segment according to claim 1, wherein each of the seats is provided with a bottom and a back.

6. An aircraft cabin segment according to claim 1, wherein each of the baggage compartments comprises a bin fixed to the ceiling of the aircraft cabin segment and a drawer that can be moved between a closed position, in which the drawer is housed in the bin, and an open position, in which the drawer projects out of the bin such that openings of the baggage compartments of each of the assemblies are aligned in the transverse direction, and the bin and the drawer have walls disposed in such a way that objects placed in the drawer are inaccessible from outside of the baggage compartment when the drawer is in the closed position and are accessible via an opening when the drawer is in the open position.

7. An aircraft cabin segment according to claim 6, wherein the drawer moves from the open position to the closed position by a substantially vertical translational movement.

8. An aircraft cabin, comprising:

at least one aircraft cabin segment according to claim 1.

9. An aircraft, comprising:

at least one aircraft cabin segment according to claim 1.

10. An aircraft cabin segment according to claim 1, wherein the ventilation outlets are disposed between the crest and the trough of the wave formed by the ceiling of the aircraft cabin segment.

11. An aircraft cabin segment according to claim 1, wherein the wave is a continuous sinusoidal wave, including at least two of the crests and at least two of the troughs, formed by the ceiling along the longitudinal direction of the aircraft cabin segment.

12. An aircraft cabin segment, comprising:

at least one longitudinally extending aisle;

seats disposed in rows that are transverse relative to the longitudinal aisle, wherein the seats of two successive rows are alternately disposed face-to-face and back-to-back;

at least one transverse aisle positioned between the rows of the seats that are disposed face-to-face; and a plurality of assemblies of baggage compartments that are aligned in a longitudinal direction of the aircraft cabin segment and positioned overhead, wherein the baggage compartments of each one of the plurality of assemblies are positioned above a respective row of the seats such that only two of the plurality of assemblies are positioned above two rows of the seats that are disposed back-to-back, and the baggage compartments are not positioned above the at least one longitudinally extending aisle and the at least one transverse aisle such that a ceiling of the aircraft cabin segment forms a sinusoidal wave along the longitudinal direction of the aircraft cabin segment having a trough above the rows of the seats that are disposed back-to-back and a crest above the at least one transverse aisle positioned between the rows of the seats that are disposed face-to-face, wherein bottom surfaces of the baggage compartments are joined such that they do not have sharp transverse edges.

13. An aircraft cabin segment according to claim 12, wherein the baggage compartments are placed above backs of the seats.

14. An aircraft cabin segment according to claim 12, wherein each of the seats is provided with a bottom and a back.

15. An aircraft cabin segment according to claim 12, wherein each of the baggage compartments comprises a bin fixed to a ceiling of the aircraft cabin segment and a drawer that can be moved between a closed position, in which the drawer is housed in the bin, and an open position, in which the drawer projects out of the bin such that openings of the baggage compartments of each of the assemblies are aligned in the transverse direction, and the bin and the drawer have walls disposed in such a way that objects placed in the drawer are inaccessible from outside of the baggage compartment when the drawer is in the closed position and are accessible via an opening when the drawer is in the open position.

16. An aircraft cabin segment according to claim 15, wherein the drawer moves from the open position to the closed position by a substantially vertical translational movement.

17. An aircraft cabin segment according to claim 12, further comprising:

air conduits extending longitudinally above the baggage compartments; and ventilation outlets connected to the air conduits and disposed between the assemblies of the baggage compartments positioned above the rows of the seats that are disposed face-to-face, substantially equidistant therefrom, to circulate air to the rows of the seats that are disposed face-to-face.

18. An aircraft cabin, comprising:

at least one aircraft cabin segment according to claim 12.

19. An aircraft, comprising:

at least one aircraft cabin segment according to claim 12.

20. An aircraft cabin segment according to claim 12, wherein the wave is a continuous sinusoidal wave, including at least two of the crests and at least two of the troughs, formed by the ceiling along the longitudinal direction of the aircraft cabin segment.

* * * * *